United States Patent [19]
Forsthuber et al.

[11] Patent Number: 6,094,933
[45] Date of Patent: Aug. 1, 2000

[54] ICE STORAGE ELEMENT

[75] Inventors: Wolfgang Forsthuber, Maisach-Gernlinden; Andreas Krompass, München; Günther Hammerschmid, Buchenhain, all of Germany

[73] Assignee: Webasto Thermosysteme GmbH, Stockdorf, Germany

[21] Appl. No.: 09/149,293

[22] Filed: Sep. 9, 1998

[30] Foreign Application Priority Data

Sep. 9, 1997 [DE] Germany .................. 197 39 389

[51] Int. Cl.[7] ........................ F25D 17/02
[52] U.S. Cl. ........................ 62/434; 62/439
[58] Field of Search .............. 62/434, 436, 439

[56] References Cited

U.S. PATENT DOCUMENTS

| | | | |
|---|---|---|---|
| 4,393,918 | 7/1983 | Patry | 165/10 |
| 4,924,935 | 5/1990 | Winckel | 165/10 |
| 5,239,839 | 8/1993 | James | 62/434 |
| 5,644,929 | 7/1997 | Tanaka et al. | 62/406 |
| 5,934,092 | 8/1999 | Krompass et al. | 62/199 |

FOREIGN PATENT DOCUMENTS

| | | |
|---|---|---|
| 0 158 378 | 10/1985 | European Pat. Off. . |
| 0 664 426 | 7/1995 | European Pat. Off. . |
| 2 574 531 | 6/1986 | France . |
| 18 82 539 | 11/1963 | Germany . |
| 1 551 365 | 4/1970 | Germany . |
| 35 31 158 | 3/1987 | Germany . |
| 989836 | 4/1965 | United Kingdom . |
| 1020211 | 2/1966 | United Kingdom . |
| 2 130 700 | 6/1984 | United Kingdom . |

*Primary Examiner*—Henry Bennett
*Assistant Examiner*—Melvin Jones
*Attorney, Agent, or Firm*—Nixon Peabody LLP; David S. Safran

[57] ABSTRACT

An ice storage element (28) with at least one profiled body (29B) surrounded by an exterior wall (37) for forming at least one storage space (34) for an ice storage medium which can be brought into heat-exchange connection with a refrigerant. For more economical configuration of this ice storage element and improved heat transfer, at least one refrigerant pipe (30) is integrated into the profiled body (29B) and the profiled body is formed of a metal. The profiled body (29B) is preferably made as an extruded aluminum section with integrated inside ribs (33) and/or external ribs (31, 32).

22 Claims, 4 Drawing Sheets

ICE STORAGE ELEMENT

BACKGROUND OF THE INVENTION

1. Field of the Invention

The invention relates to an ice storage element with a profiled body which is surrounded by an outer wall for formation of at least one storage space for an ice storage medium which can be brought into heat-exchange contact with a refrigerant.

2. Description of Related Art

An ice storage element known from German Patent Application DE 35 31 158 A1 has a housing formed of a hollow polyethylene section into which metallic refrigerant pipelines are inserted and fixed relative to the walls by additional holding parts. Heat transfer from the cold storage medium within the housing to the air flowing past externally is poor due to the plastic housing. The refrigerant pipelines must be secured with additional components in a complex manner, due to which such an ice storage element is expensive to manufacture.

SUMMARY OF THE INVENTION

A primary object of the present invention is to devise an ice storage element which can be economically produced and which has good heat transfer.

This object is achieved by at least one refrigerant pipe being integrated into a metal profiled body. By integrating the refrigerant pipe into the profiled body, on the one hand, economical production of the profiled body, for example as a lightweight metal extruded section, is possible. On the other hand, as a result of the metal walls, outstanding heat transfer is possible both from the refrigerant pipe to the cold storage medium and also from the latter through the outside wall to the air flowing past. Heat transfer is further improved by inside ribs also extending from the refrigerant pipe into the storage space.

Especially in a rectangular exterior configuration of an ice storage element, it is advantageous if the profiled body has at least two refrigerant pipes in a symmetrical arrangement. In this case, the inside ribs proceeding from the refrigerant pipe can preferably likewise have a symmetrical arrangement.

To improve heat transfer from the ice storage medium to the air which is to be cooled and which streams past on the outer walls of the profiled body, it is advantageous if the exterior ribs extend outwardly from the outer wall of the profiled body and serve at least partially to define the air channels. These exterior ribs, preferably, have connecting elements for coupling to adjacent ice storage elements, so that several ice storage elements can be easily connected to form a self-supporting ice storage module. In one especially preferred embodiment, the exterior ribs are, in one part, made as bridge-like ribs, and in another part, as fork-shaped ribs which can each be engaged in pairs with the ribs of an adjacent ice storage element by form-fit.

As effective protection against crack formation in the outer wall, when filling the ice storage element with an ice storage medium which expands in the phase transition/freezing, it is advantageous if a volume-compensating element is incorporated into the profiled body at the same time. This compensator can, for example, be formed by an air-filled hollow body or closed-cell foamed body or other rubber-elastic element.

According to one especially preferred embodiment, a gas hydrate, i.e. a mixture of water and various fluorohydrocarbons or hydrocarbons, is used as the cold storage medium in which, during a phase transition, no expansion occurs, so that compensation elements can be omitted. Where water is mentioned below, it is to be understood that other storage media are intended to be encompassed as well.

The profiled body of the ice storage element is preferably sealed on the face by bottom parts which are joined to the outer wall by welding, soldering or cementing, by a press fit or by screwing with a seal. At least one of the bottom parts, preferably, has a hole or connecting branch for passage of the refrigerant to the refrigerant pipe.

In the following several embodiments of the invention are described using the drawings.

DETAILED DESCRIPTION OF THE INVENTION

Figure 1:
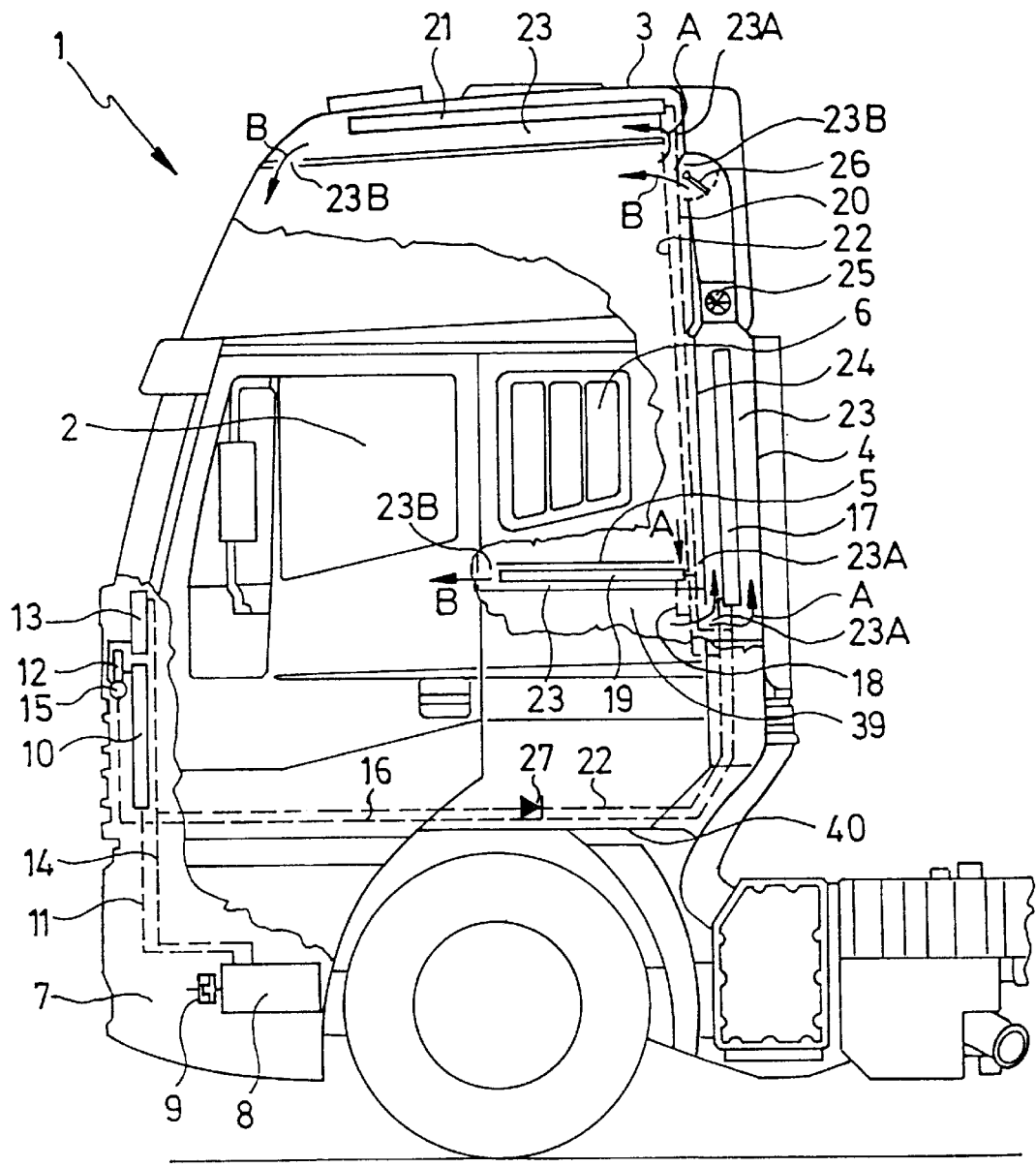
FIG. 1 is a schematic partially broken-away side view of the driver's compartment of a truck with a compression refrigeration system and several ice storage modules.

FIG. 1 shows the part of a truck 1 within which the driver's compartment 2 of the vehicle interior is formed. Driver's compartment 2 is bordered to the top by roof 3 and to the back by rear wall 4. Within the rear part of the compartment is a horizontal bulkhead 5, as is conventionally provided as a sleeping surface for dividing the sleeping cove in a long distance truck in which the rear part of driver's compartment 2 is made as sleeping compartment 6.

In engine compartment 7 of truck 1, there is a compressor 8 which can be joined to the drive engine of the vehicle (not shown) via V-belts by magnetic coupling 9. Compressor 8 is incorporated into a first refrigerant loop, it being joined via a supply line 11 to a condenser 10, a collector 12 and a first evaporator 13 with an expansion element. The refrigerant flowing in the first refrigerant loop is returned from the first evaporator 13 via a return line 14 to the compressor 8.

Between the collector 12 and the first evaporator 13 is a reversing valve 15 in which the supply line 11 diverges from the branch supply line 16 of the refrigerant loop. One or more ice storage modules which each consist of a second evaporator with an expansion element and an ice storage surrounding it are integrated into this second refrigerant loop. First ice storage module 17 is located in the area of rear wall 4 of truck 1. The refrigerant flowing via branch supply line 16 can be routed via branch line 18, optionally by means of a reversing valve which is not shown, to second ice storage module 19 and third ice storage module 21. The second ice storage module 19 is located in the horizontal bulkhead 5 in the area of sleeping compartment 6.

A third ice storage module 21 is located in the area of roof 3. Via another branch line 18, the third ice storage module 21 is connected to the refrigerant branch supply line 16. Ice storage modules 17, 19 and 21 are connected to a common return line 22 which is, itself, connected by the refrigerant return line 14 to compressor 8. A nonreturn valve 27 located in return line 22 prevents backflow of refrigerant gas to ice storage modules 17, 19 and 21 and condensation there.

Ice storage module 17 is located in a holding space 23 which is provided between the rear wall 4 of the driver's compartment 2 and an intermediate wall 24 that is at a distance in front of it. Selectively, the ice storage module can also be inserted into a cutout of the rear wall 4. Likewise, ice storage module 21, provided optionally or alternatively, in the roof area and the other ice storage module 19, provided optionally or alternatively, in the area of horizontal bulkhead 5 are each provided in a respective holding space 23 which is produced by a double wall.

Holding spaces 23 are each connected by an inlet 23A and an outlet 23B to the driver's compartment 2, so that air flow can take place through the double-walled holding space 23. This air flow, which takes place either by convection as a result of temperature-induced density differences of the air in driver's compartment 2 or which arises necessarily by optional fan 25, can be controlled by means of shutoff device 26. Shutoff device 26 is made, for example, as a pivoting flap which, for example, is shown on the top end of the holding space 23 for ice storage module 17. The flap can be actuated by hand or by a motor, and can be replaced by other corresponding shutoff devices, such as movable lattices or slide valves. Even if this is not shown in FIG. 1, it goes without saying that the other holding spaces 23 can be equipped with a corresponding shutoff device and/or fan for ice storage modules 19 and 21. Air flows through inlet 23A, according to arrow A in holding space 23, is routed past a respective ice storage module 17, 19 and 21, and in doing so, is cooled and leaves holding spaces 23 through outlet openings 23B, according to arrow B, as cooled air in the direction to driver's compartment 2.

The system is preferably designed such that compressor 8 has enough power to make available not only enough cooling performance for first evaporator 13 for normal cooling of driver's compartment 2 while driving, even with high cold demand during operation of the vehicle engine, but in addition to charge one or more of ice storage modules 17, 19, 21 by converting water into ice so that, at a subsequent stop, the driver's compartment 2 can be cooled by a simple flow of air through respective holding spaces 23. This ensures that the driver, during rest or sleeping breaks, is in a pleasant climate in driver's compartment 2 even in hotter climates.

Figure 2:
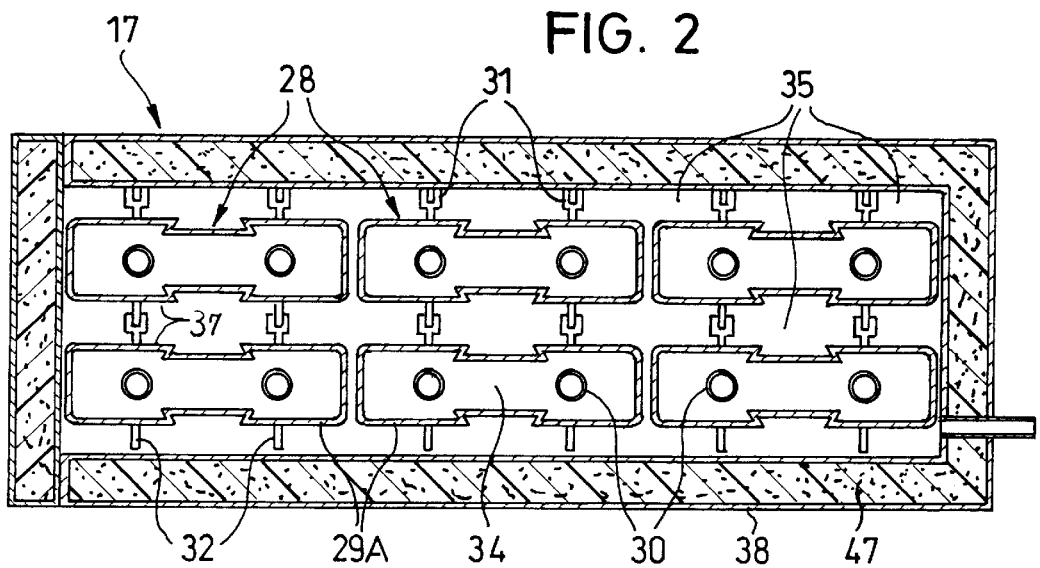
FIG. 2 is a cross-sectional view through an ice storage module with several ice storage elements.
Figure 3:
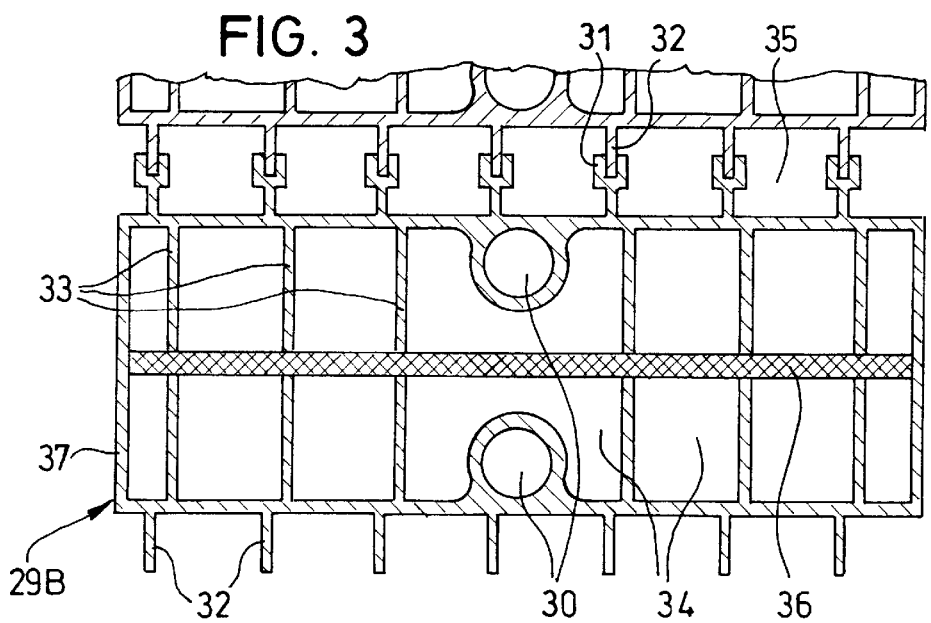
FIG. 3 shows an enlarged cross section of an ice storage element with a rectangular cross section, straight inside ribs and two refrigerant pipes.

FIG. 2 shows one of the ice storage modules 17, 19, 21 in cross section; for example, module 17 is used here without implying that modules 19 or 21 need be any differently constructed. Within surrounding outer housing wall 38 and insulating layer 47, in this embodiment, there are a total of six ice storage elements 28 in the form of an elongated profiled bodies 29A. Each profiled body 29A is preferably made as an extruded section of a lightweight metal, such as aluminum, and can be cut to the desired length as necessary. Two refrigerant pipes 30 are integrated within the cross section of profiled body 29A, and through them, refrigerant flows from branch supply line 16 to the ice storage modules, and thus, to the ice storage elements 28 located therein. Within each ice storage module 17, 19, 21, the ice storage elements 28 are flow-connected in series and/or parallel by elbows (not shown) and which are located in the area of the end faces.

On the outer wall 37 of the profiled bodies 29A, each body has two fork-shaped ribs 31, and on the opposite wall, bridge-shaped ribs 32. Here, there is a holding groove formed on the front end of fork-shaped rib 31 for holding bridge-shaped rib 32 of an adjacent ice storage element 28. By form-fitted engagement of ribs 31 and 32 into one another modular ice storage modules of any size can be assembled from any number of ice storage elements 28 in a self-supporting structure. Here, in the area of ribs 31 and 32 there can be additional connecting elements such as clips, transverse screw couplings or adhesive beads.

It becomes apparent from the cross sections of the different versions of the ice storage elements 28 as shown in FIGS. 3–9 that at least one, but preferably several, refrigerant pipes 30 are integrated into the variously configured profiled bodies 29A, 29B, 29C, 29D, 29E, 29F. Preferably, several inside ribs 33 extend from these refrigerant pipes 30 into the interior of the profiled bodies in which at least one storage space 34 is formed to hold an ice storage medium. In the simplest case, water is used as the ice storage medium. However, the water can, optionally, be mixed with additives, such as salts, inhibitors, fungicide or the like.

According to one alternative embodiment, a gas hydrate can be provided as the ice storage medium. The advantage to using a gas hydrate is that it experiences no notable volume change in a phase transition.

In cases in which water is used, the volume expansion during freezing is accommodated by a volume-compensating member 36 which is shown, by way of example, as a plate-shaped or rod-shaped member in FIGS. 3 and 5–7. This compensating member 36 can be formed, for example, by an air-filled hose or by a closed-cell foam which is accordingly compressible. As is apparent from FIGS. 3 and 5–7, volume-compensating member 36 is inserted preferably between interior ribs 33 and is held by them in its position.

The interior ribs 33 can have different shapes. Depending on whether the refrigerant pipes 30, for a rectangular cross section of outer walls 37 of profiled bodies 29, are located roughly in the middle of the long sides (FIG. 5), roughly in the middle of the short sides (FIG. 6), or running diagonally between corner areas (FIG. 7), interior ribs 33 have a finger shape which extends in different directions and which is variously formed. Interior ribs 33 are used to uniformly and completely freeze the ice storage medium located in intervening storage spaces 34 within a short time. Conversely, when the ice storage thaws, the interior rib structure is used to deliver high cooling performance to exterior wall 37 of ice storage elements 28 within a relatively short time, where it is absorbed by air routed through air channels 35. Air channels 35 are preferably located in the intermediate spaces bounded by the exterior ribs 31 and 32 between ice storage elements 28.

Figure 4:
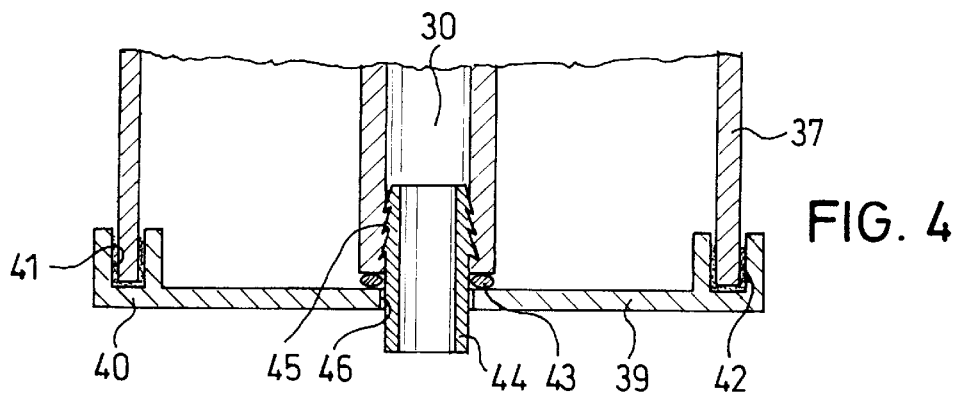
FIG. 4 shows a partial longitudinal section through an ice storage element in the bottom area.
Figure 5:
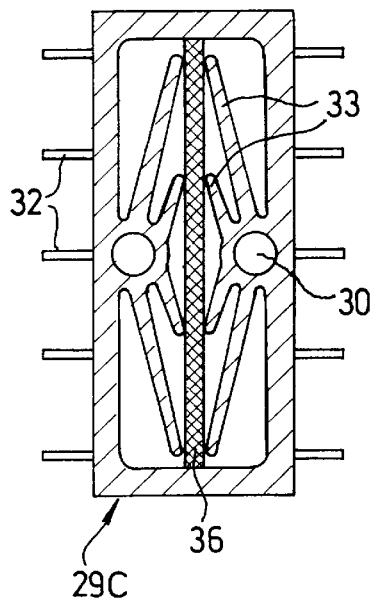
FIGS. 5–7 each show a respective one of three other versions of an ice storage element with variously shaped internal ribs and variously arranged refrigerant pipes.
Figure 6:
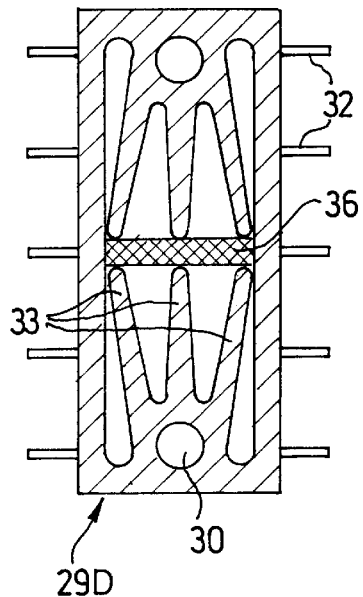
Figure 7:
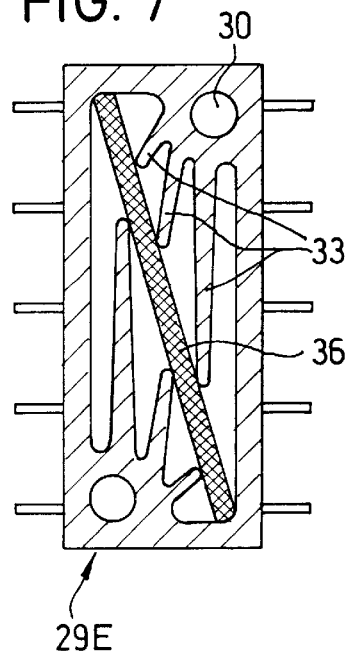

On the top and bottom, profiled bodies 29A through 29F are closed by means of a bottom part 39 which is matched to the shape of the profiled part. As shown in FIG. 4, a sealing edge 40 of base part 39, for example, is disposed in a form-fitted manner around exterior wall 37 of profiled body 29 and is attached there, in groove 41 formed by the doubled edge of the sealing edge 40, by adhesive 42 or also by welding or soldering. To connect refrigerant pipe 30 to the supply lines for the refrigerant which branch from branch supply line 16 or to return line 22 in at least one of bottom parts 39, there is at least one hole or recess 46 through which connecting branch 44 of the refrigerant lines is inserted into refrigerant pipe 30. Sealing and attachment take place preferably by means of a flexible toothed seal 45 on connecting branch 44 and/or an additional seal by means of O-ring 43 or a sealing agent on the faces of refrigerant pipes 30.

Figure 8:
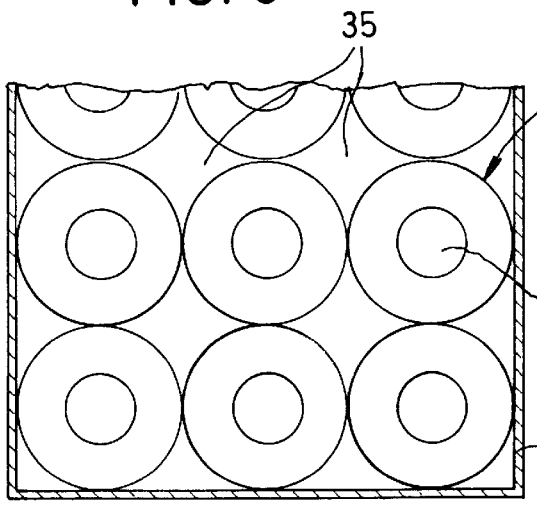
FIG. 8 is a partial cross-sectional view through an ice storage module with cylindrical ice storage elements.
Figure 9:
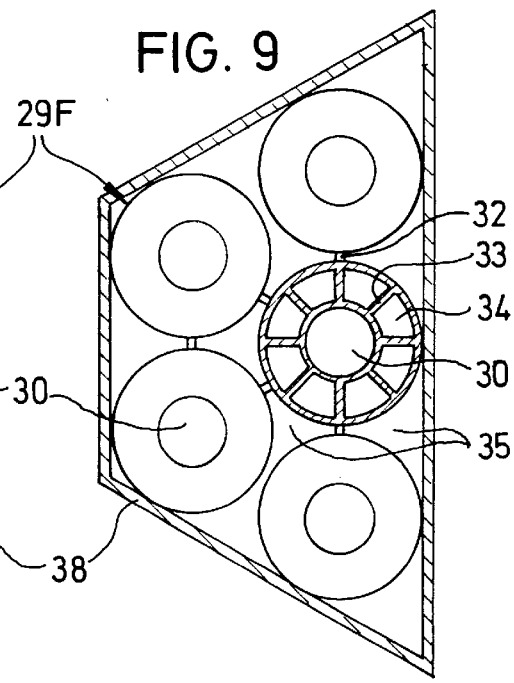
FIG. 9 shows a modified version of the FIG. 8 embodiment.

In FIGS. 8 & 9, in contrast to the preceding embodiments, ice storage elements 28 are shown in which profiled bodies 29F have a circular cross section. In this case, it is a good idea, as is shown on one of the profiled bodies in FIG. 9, to integrate a single, centrally arranged refrigerant pipe 30 into the profiled body, from which radially running interior ribs 33 extend outwardly to exterior wall 37 with formation of interposed storage spaces 34. Cylindrical profiled bodies 29F can, as shown in FIGS. 8 & 9, be joined to one another in different ways. In the intermediate spaces, in the first case, air channels 35 are formed in the shape of a rectangle with spherically curved walls, and in the case of FIG. 9, of a spherically curved triangle.

Figure 10:
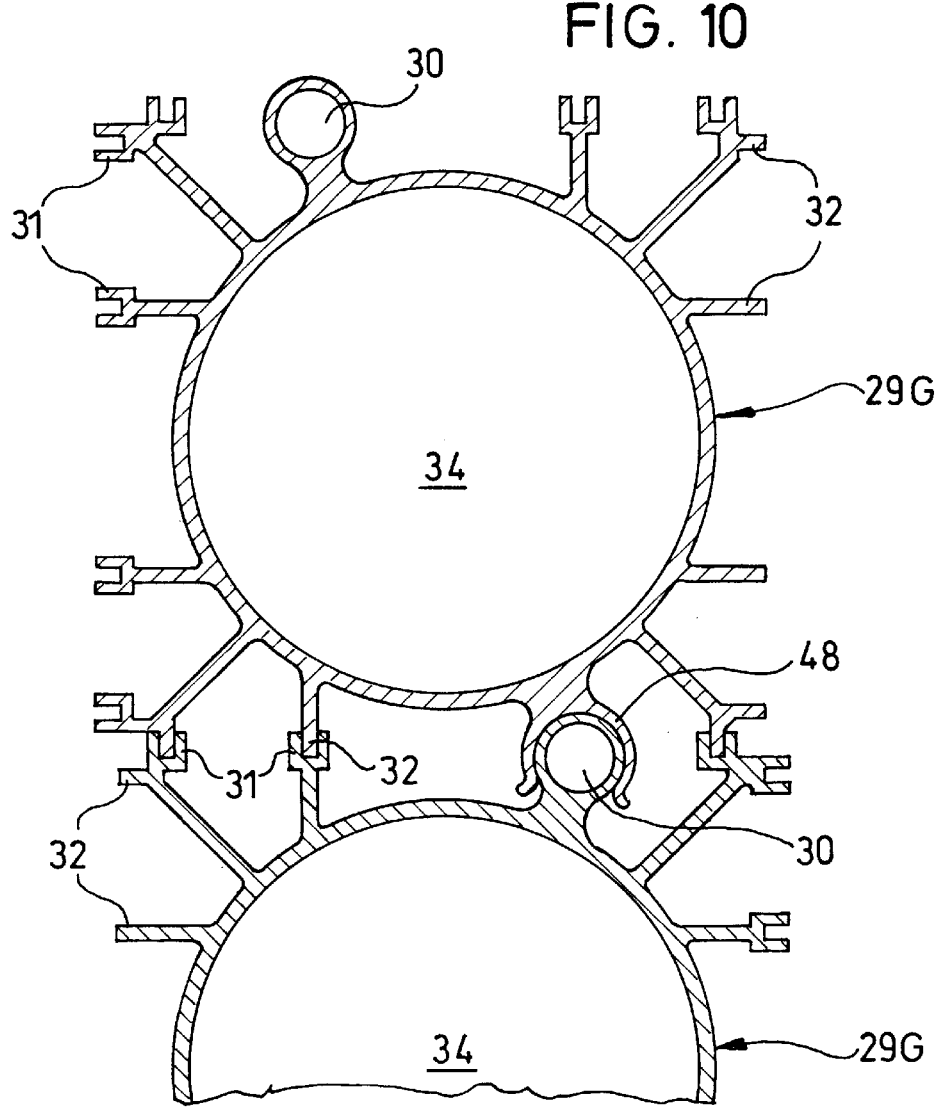
FIG. 10 is a cross-sectional view an embodiment with external refrigerant pipes.
Figure 11:
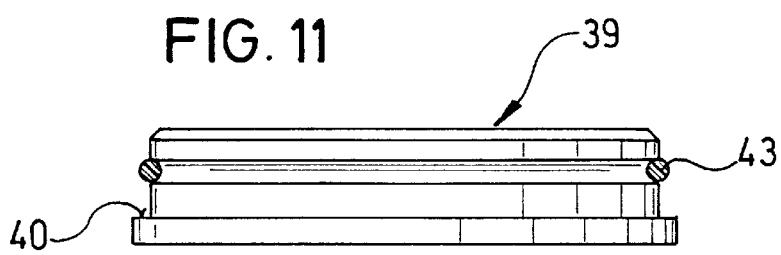
FIG. 11 shows a bottom part for the embodiment of FIG. 10.

FIGS. 10 & 11 show another version of ice storage element 28 in which profiled body 29G has a central tubular part that forms the storage space 34, at least one refrigerant pipe 30 which is joined integrally to it (e.g., by being part of the same one-piece molding) and which is located on the periphery, and several external ribs which are preferably provided on two adjoining sides with identical connecting elements. The connecting elements thus lie on a rectangular envelope curve of profiled body 29G. Diagonally opposite refrigerant pipe 30 on profiled body 29G is a plug connection 48 formed as an open profiled part into which a refrigerant pipe 30 of a like, adjacent profiled body 29G can be inserted axially or radially. By means of the illustrated shape of profiled body 29G, identical profiles can be used to produce ice storage modules 17, 19, 21 of any size by alternating reversed insertion into one another. Heat transfer through plug connection 48 provides for additional cooling of storage space 34 of adjacent profiled body 29G.

The version as shown in FIG. 10 can be sealed by means of a simple, rotationally symmetrical bottom part 39 when the interior ribs are omitted. Both the surrounding surface, optionally with an additional O-ring 43 inserted into a groove, or also a sealing edge 40 which is formed as a projecting collar, optionally with additional sealing means, can be used as sealing surfaces. Attachment of bottom part 39 can, as already described above, be produced by welding, soldering, cementing, pressing in or screwing.

Rotationally-symmetrical formation also enables simple integration of a volume equalization element of the piston-type or an elastic body integrated into the bottom part 39.

Regardless of the selected profile shape of profiled body 29, by means of the invention, as a result of the large surfaces and metallic material, good heat transfer with short freezing lengths can be achieved. In this way, short charging times of ice storage modules 17, 19, 21 can be achieved and if necessary also relatively high cooling performance. In contrast to the known plastic profiled bodies there is no deformation of the tubular profile at all. The ice storage elements are very light when using extruded aluminum sections, have high heat conduction, enable almost any rib structure, optimum heat transfer and cooling performance and finally modular, self-supporting ice storage modules. Production thus becomes simpler and more cost favorable.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Ice storage element with at least one profiled body surrounded by an exterior wall for forming at least one storage space for an ice storage medium and which is thermally communicatable with a refrigerant via a heat-exchange connection; wherein at least one refrigerant pipe is integrated into the at least one profiled body; and wherein the profiled body is formed of a metal; wherein external ribs extend from an outer wall of the profiled body and at least partially define air channels.

2. Ice storage element as claimed in claim 1, wherein the external ribs have connecting elements for connection of the ice storage element to a like, adjacent ice storage element.

3. Ice storage element as claimed in claim 2, wherein the external ribs are bridge-shaped and are engageable in pairs with external ribs of the like, adjacent ice storage element.

4. Ice storage element comprising at least one profiled body, said at least one profiled body having an exterior wall made of metal which forms at least one storage space for an ice storage medium, and at least one refrigerant pipe section for circulation of a refrigerant in heat-exchange relationship to the ice storage medium in said at least one storage space; wherein said at least one refrigerant pipe section is directly incorporated into the at least one profiled body as an integral part thereof.

5. Ice storage element as claimed in claim 4, wherein the profiled body is made of an extruded section.

6. Ice storage element as claimed in claim 4, wherein the refrigerant pipe section and internal ribs are located within the storage space.

7. Ice storage element as claimed in claim 4, wherein the profiled body has at least two refrigerant pipe sections disposed in an axisymmetrical arrangement.

8. Ice storage element as claimed in claim 4, wherein the at least one profiled body is filled with an ice storage medium which expands during the phase transition and also contains at least one compressible volume-compensating member that compensates for expansion of the ice storage medium.

9. Ice storage element as claimed in claim 8, wherein the volume-compensating element is made as one of an air-filled hollow body and a compressable closed-cell foam body.

10. Ice storage element as claimed in claim 4, wherein the profiled body is closed at end faces thereof by bottom parts which are joined to an outer wall of the profiled body by one of welding, soldering, cementing, screwing or pressing.

11. Ice storage element as claimed in claim 10, wherein in at least one bottom part has a hole/recess or a connecting branch for passage of the refrigerant to the refrigerant pipe section.

12. Ice storage element as claimed in claim 4, wherein the ice storage medium is a gas hydrate.

13. Ice storage element as claimed in claim 4, wherein a plurality of profiled bodies are disposed within an outer housing wall.

14. Ice storage element as claimed in claim 13, wherein said plurality of profiled bodies have a generally rectangular external configuration.

15. Ice storage element as claim in claim 14, wherein said at least one refrigerant pipe section comprises a plurality of refrigerant pipe sections which are incorporated into an outer wall of the profiled bodies as parts thereof.

16. Ice storage element as claim in claim 15, wherein internal ribs radiate from said refrigerant pipe sections; wherein each profile body is filled with an ice storage medium which expands during the phase transition and also contains a compressible volume-compensating member that compensates for expansion of the ice storage medium, said volume-compensating member being supported within the profile body between ends of said internal ribs.

17. Ice storage element as claimed in claim 13, wherein each of said plurality of profiled bodies have a generally cylindrical outer wall.

18. Ice storage element as claimed in claim 17, wherein said at least one refrigerant pipe section is a single refrigerant pipe disposed coaxially with respect to said cylindrical outer wall; and wherein internal ribs radiate from said refrigerant pipe section to said cylindrical outer wall.

19. Ice storage element as claimed in claim 18, wherein each of the profiled bodies is formed of a one-piece construction except for closure parts provided for axial ends thereof.

20. Ice storage element as claimed in claim 4, wherein the at least one profiled body and the at least one refrigerant pipe section are formed of a one-piece construction except for closure parts provided for axial ends of the profiled section.

21. Ice storage element as claimed in claim 4, wherein the at least one profiled body comprises a plurality of profiled bodies connected in series; and wherein the at least one refrigerant pipe section of each profiled body is flow-connected to a respective refrigerant pipe section of at least one other profiled body.

22. Ice storage element as claimed in claim 4, wherein said plurality of profiled bodies are disposed within an outer housing wall.

* * * * *